United States Patent Office 3,060,740
Patented Oct. 30, 1962

3,060,740
TURBINE METER WITH MINIMIZED
VISCOSITY ERROR
Albert J. Granberg, Oakland, Calif., assignor to Granberg Corporation, Oakland, Calif., a corporation of California
Filed Nov. 16, 1959, Ser. No. 853,293
2 Claims. (Cl. 73—230)

My invention relates to liquid meters and more particularly to meters of the turbine type.

A liquid meter, basically involves a liquid flow actuated means, and registering means responsive to the flow actuated means for recording the quantity of liquid flowing through the meter during the recorded period. In a turbine type meter, the flow actuated means is the turbine rotor assembly which is disposed in the flow path, and the registering means may be a counter driven by the rotor.

The present invention is concerned primarily with the effects of viscosity of a liquid on the accuracy of a meter through which the liquid is flowing, and involves means for minimizing such effects to a degree where the influence on the accuracy of the meter is so small that it may be ignored or disregarded.

Due to its viscosity, a liquid has a tendency to form a coating or film on surfaces with which it comes in contact, and accordingly a liquid flowing through a meter, will coat the walls and blades of such meter. The thickness of the viscosity film is directly related to the rate of flow of a liquid through the meter, and inasmuch as the viscosity of any liquid will change with temperature, the viscosity film thickness will also vary as a function of temperature of the liquid.

It will be appreciated, therefore, that a film or coating on the components of a meter responsible for metering a liquid as it flows therethrough, will alter the effective flow capacity of such meter, and such change in capacity will vary not only with changes in velocity but also with changes in temperature of liquid flowing through the meter. This is particularly prevalent in a meter of the turbine type which involves a substantial number of blades. A variation in thickness of the film on such blades can, therefore, appreciably alter the capacity of a meter and thus introduce errors in its readings, and particularly in the case of petroleum liquids having inherently high viscosity characteristics.

In designing a liquid meter, the load imposed on the rotor by the counter and drive connection between the rotor assembly and the counter, must be readily overcome for the meter to function. The drive power of the rotor is a function of its exposed blade area and this must be more than adequate to render the meter effective.

Meters, as determined by their intended purpose, are also necessarily limited as to size. For example, a meter for installation in a pipe line, must be capable of being assembled in such pipe line. Another limiting factor is the flow velocity range within which the meter is to function. Accordingly, with a required total blade area and limitations as to diameter of rotor, the number of blades required in a meter of conventional single rotor type is fairly well determined by conditions beyond control of the designer.

Assuming that such a meter reasonably required twelve blades to its rotor, a viscosity liquid flowing through such meter will form a film over each surface of each blade, thereby adding to the total thickness of the twelve blades, the total thickness of twenty-four viscosity films. These films furthermore will vary with changes in both temperature and velocity of the liquid, becoming thinner with increasing temperature and/or velocity of the liquid, and thicker as the temperature and/or velocity drops.

With a substantial number of blades involved, such films can and do alter the capacity of the meter, making it impossible to maintain a high degree of accuracy, particularly when metering liquids of high viscosity characteristics.

Among the objects of my invention are:
(1) To provide a novel and improved liquid meter of the turbine type;
(2) To provide a novel and improved liquid meter of the turbine type, in which adverse viscosity effects have been minimized;
(3) To provide a novel and improved liquid meter of the turbine type in which the effects of velocity changes on meter readings, are minimized by the meter construction to the point of permitting, insofar as flow velocity effect is concerned, an accuracy within the limits prescribed by the National Bureau of Standards, namely an accuracy within .2 of 1% from 0°–120° Fahrenheit within the operating range of the meter, that is from 100% capacity down to 20% capacity.

Additional objects of my invention will be brought out in the following description of the same, taken in conjunction with the accompanying drawings, wherein.

Figure 1:
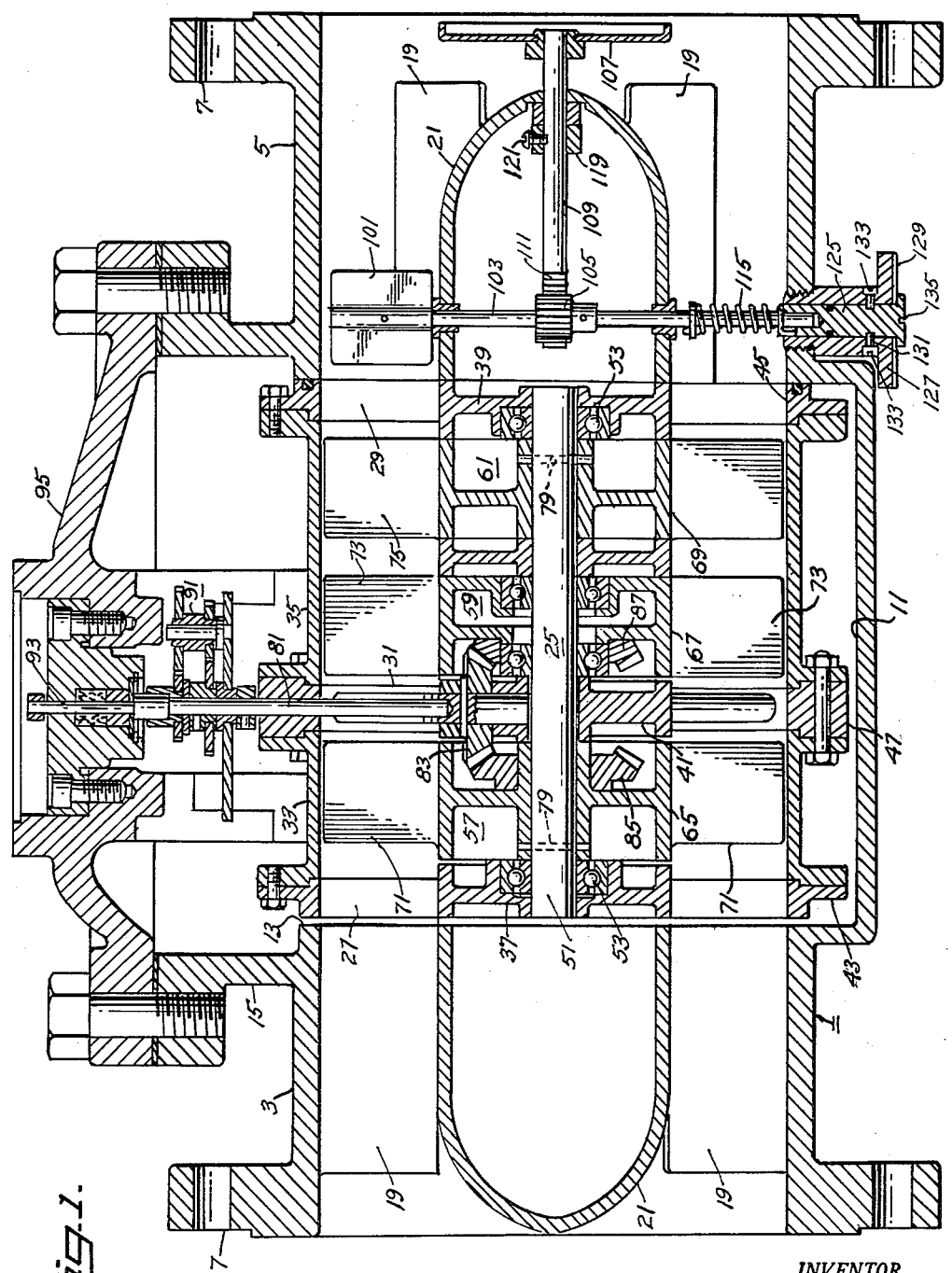
FIG. 1 is a longitudinal view in section through a turbine type meter embodying the features of the present invention.
Figure 2:
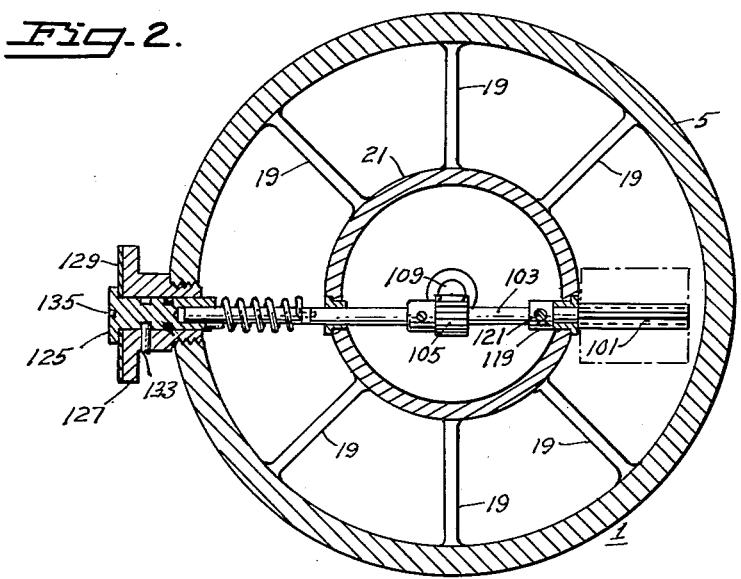
FIG. 2 is a transverse view in section through the meter of FIG. 1 taken in the plane 2—2 of FIG. 1.
Figure 3:
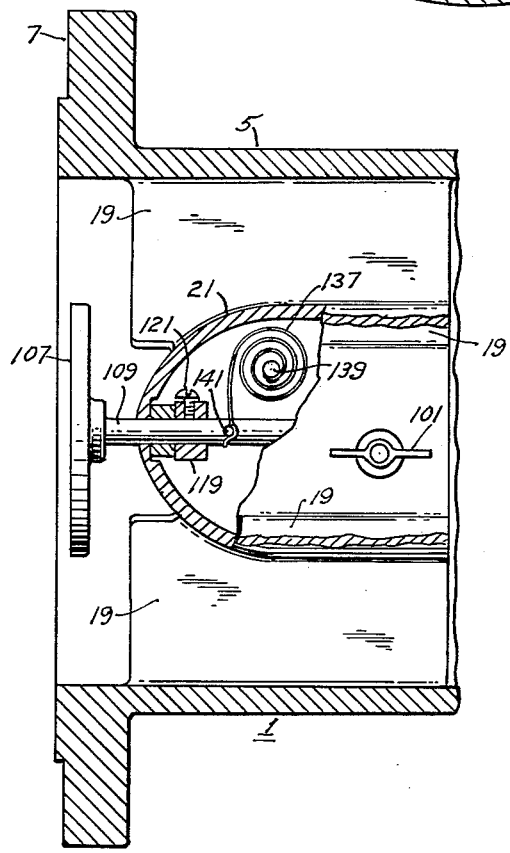
FIG. 3 is a fragmentary view depicting a different form of a feature of the meter of FIG. 1.

In accordance with the present invention, the meter is so constructed that by its very construction, it not only reduces viscosity errors regardless of cause, but further compensates for any residual viscosity errors attributable to velocity changes.

The present invention is predicated, in one respect, upon the thought that by reducing the total linear blade exposure to the incoming liquid, there will be twice the reduction in linear edges of viscosity layers facing the liquid approaching the meter, since each blade will have two film layers thereon, and that if such reduction can be carried to a sufficient extent, then meter errors traceable to changes in viscosity film on the rotor blades may be reduced greatly, regardless of the causes of such changes. Any residual errors attributable to flow velocity effect on the resulting blade structure may be further reducible, when desired, by compensating means incorporated into the meter structure.

Merely reducing the dimensions of the rotor blades in the radial direction, will serve to effect such reductions in exposed edges of viscosity layers, but aside from the fact that the intended application of the meter might mitigate against such reduction in its size, the resulting reduction in the blade area might render the meter incapable of operating, long before the point is reached where the errors due to viscosity films on the blades can be minimized to the point of being ignorable.

I have been able to approach such minimized goal, by, in effect, removing intermediate blades in their entirety, as they would normally appear on a conventional rotor, and installing them on additional rotors of like diameter; such additional rotors being disposed in tandem, to constitute a rotor assembly in which successive rotors rotate preferably in opposite directions. In this manner, the total required blade area can be maintained, and in fact, increased if desired, while the exposed blade edge length in any transverse plane through the rotor assembly can be very materially reduced, in fact down to one third or less.

Aside from this advantage, the reverse rotation of successive rotors in the rotor assembly has the desirable effect of reducing swirling and turbulence of the liquid.

Accordingly, to bring the accuracy of a meter within the limits set by the Bureau of Standards, while maintaining the diameter of the rotor, to otherwise meet practical requirements, a practical embodiment of the invention should include a plurality of rotors, e.g. at least three rotors in the rotor assembly, and when so made, the number of blades on each rotor will equal the number required in a corresponding single rotor meter divided by the number of rotors in the rotor assembly. Thus if the corresponding single rotor meter would have twelve blades, then each rotor of a three rotor assembly of the present invention would have only four blades. This, then, would not only reduce the exposed blade edges in any transverse plane to but one third of that prevailing in a twelve blade rotor, but due to the lesser number of blades per rotor, the changes in meter capacity due to variations in viscosity film thickness will be reduced proportionally.

Referring to the drawings for details of such a meter in its preferred form, the same comprises a main housing 1 in the general form of a pipe section having spaced end sections 3 and 5, each terminating in a coupling flange 7, and an intermediate section provided with a well 11 at its lower end and having a wall opening 13 at its upper side bounded by a flanged wall 15.

Each end section includes a plurality of substantially radial vanes 19 extending inwardly therefrom and terminating in and supporting a hollow flow guide 21 on the longitudinal axis of the housing.

The main housing is adapted to permit insertion through the aforementioned opening 13 of a rotor assembly 25 including end spiders 27, 29 and an intermediate spider 31 suitably spaced by cylindrical flanged sections 33, 35 of a rotor assembly housing.

Each of the spiders includes a hub 37, 39, 41 respectively in alignment with each other and spokes radiating therefrom and terminating in a peripheral ring 43, 45, 47 respectively, which enables bolting together of the spiders and the rotor assembly housing sections.

A rotor shaft 51 passes freely through the hub 41 of the intermediate spider, and is journalled at its ends in the hubs of the end spiders 37, 39, suitable bearing assemblies 53 being provided in such end spiders for this purpose. This shaft is adapted to carry a plurality of rotors, preferably a minimum of three rotors 57, 59 and 61, each including a hub 65, 67 and 69 respectively.

One of these rotors 57 is located to one side of the intermediate spider 31 and adjacent thereto, and is provided with angularly disposed blades 71 about the periphery of its hub 65.

The second turbine rotor 59 is located to the other side of and adjacent to said intermediate spider and includes angularly disposed blades 73 about the periphery of its hub 67 but at an angle producing a direction of rotation reversed to that of the first mentioned rotor 57.

The third turbine rotor 61 on the shaft is in proximity to the second mentioned rotor 59, includes angularly disposed blades 75 about its hub periphery, the angle of these blades corresponding in direction to those of the first mentioned rotor 57 whereby, in response to flow of liquid through the rotor assembly, the first and third rotors will revolve in the same direction, which will be in reverse to that acquired by the second rotor 59.

Those rotors having similar blade characteristics, in this instance, the first and third rotors, are fixed to the shaft 25 as by pins 79 diametrically through the shaft and into the hubs of these rotors.

The rotational movements of the rotors 57, 59 and 61 are converted to rotation of a meter shaft 81 by a drive means including a bevel gear 83 disposed within the hub 41 of the intermediate spider, where it is mounted on the meter shaft 81, which extends radially from the hub of the spider and is capable of rotational movement therein.

The bevel gear 83 is of sufficient diameter to extend to either side of the hub of the intermediate spider, to be engaged by corresponding bevel gears 85, 87 mounted on the hubs of the first and second rotors 57, 59 respectively.

The meter shaft extends upwardly in the conventional manner and drives through a gear train 91 to a suitable coupling 93 for a counter or the like, not shown but which would be mounted on a cover 95 which is bolted down to the flange wall 15 of the main housing.

The number of blades per rotor will, in accordance with the present invention, equal in number to that required for a comparable meter having one rotor of like diameter, divided by the number of rotors employed. In the present illustrated embodiment, each rotor will have one-third the number of blades which a comparable meter of the single rotor type will require.

Thus, with one-third the number of blades, the number of blade edges exposed to the incoming liquid will be one third that present in a comparable meter having but one rotor. Consequently, only one-third the number of viscosity films that could affect the flow capacity of the meter, can be formed, which means that errors which ordinarily would be attributed to variations in thicknesses of viscosity films on the blades of the meter of the turbine type, have been reduced by two-thirds when the rotor assembly employs three rotors as in the present embodiment. This reduction, for many liquids, will be adequate to bring the accuracy of the meter to within the standards set by the Bureau of Standards.

For some liquids having a normally high viscosity, a further reduction in any residual viscosity errors attributable to variation in viscosity film thickness on the blades of the meter, may be desirable. In such cases, the residual viscosity errors may be charged, primarily, to flow velocity changes, and the meter may then include suitable means to compensate for any film variations attributable to such velocity changes.

Such means will include a vane 101 adapted to fit into the space between the flow guide 21 at the intake end of the meter housing and the wall of said housing, such vane being mounted on the end of the shaft 103 which passes through the flow guide and beyond, to rotatable mount the vane in such position.

The angular position of this vane is caused to shift from an initial position, in response to flow of liquid through the meter, by providing a pinion 105 on the vane shaft 103 at a point within the flow guide, and controlling angular movement of such pinion and shaft by means of a piston assembly including a piston 107 in the flow path of liquid through the meter, the piston having a piston rod 109 slidably entering the flow guide and including a rack 111 in engagement with the pinion 105.

Movements of the piston are partially resisted by spring means which in one embodiment of the invention, as illustrated in FIG. 1, includes a coil spring 115 mounted on the exposed end of the vane shaft 103 and anchored at one end to such shaft, while the other end of the spring is anchored to a fixed point associated with the main housing. Such spring will be stressed in a direction tending to force the piston outwardly of the meter housing in the absence of liquid flow, and to avoid movement of the piston in this direction to the extent of disengaging the rack 111 on the pinion 105, a stop collar 119 with a locking screw 121 is mounted on the piston rod within the flow guide, the maximum permissible forward travel of the piston then being determined by the point on the piston rod at which such collar is fixed to the piston rod.

Since an increase in the flow velocity of the liquid will tend to thin down the viscosity film on the rotor blades, to thereby effectively increase the flow capacity of the meter per revolution of the rotor assembly, the meter under these conditions, would tend to register low and a slight speeding up of the rotor assembly would be called for to compensate for this velocity increase.

If the vane therefore, in response to an increase in velocity of the liquid flowing through the meter, has its angular position altered somewhat to direct a portion of the flow at a steeper angle against the blades of the proximate rotor, the overall force of the liquid striking the blades of the first rotor will, to this extent, be increased and will thereby add an increment of rotational speed to the rotor assembly.

Conversely, with a drop in velocity of the liquid flowing through the meter, the viscosity films on the rotor blades will have a tendency to increase in thickness and the flow capacity of the meter per revolution of the rotors will, to this extent, be decreased and the meter will read high. Under these conditions, compensation may be effected by causing the vane to alter its angular position to present a shallower approach angle to the blades of the proximate rotor and thus slightly decrease the overall drive force of the liquid flowing through the meter.

By initially adjusting the vane to make a shallow angle with respect to the blades of the proximate rotor and with the piston in its outermost position, and then by utilizing a spring having a calibration which will permit maximum anticipated flow rate of liquid within the permissible travel of the piston, a full range of compensation may be realized.

Some adjustment in this connection may be effected by pre-winding the spring to a greater or lesser degree and this may be made possible by anchoring the housing end of the spring 115 in the end of a bushing 125 which is rotatably disposed in a flanged knob 127 threadedly secured into the wall of the housing and adapted to carry a scale 129 or other meaningful symbol on the face thereof. The bushing may be provided with a peripheral groove 131 at an intermediate point, to be engaged by one or more set screws 133 in the neck of the knob to lock the bushing following such adjustment of the spring.

A screw slot 135 in the exposed end of the bushing, permits of the use of a conventional screwdriver to effect winding of the spring. A symbol or indication on the end of the bushing may be utilized in conjunction with the scale on the face of the knob to ascertain significant adjustments.

An alternative spring means for use in lieu of that just described, may take the form of a clock spring 137 within the flow guide and affixed at its inner end to a shaft 139 passing through the flow guide transversely thereof and journalled therein. The free end of the spring will be abutted against a cross pin 141 or the like through the piston shaft 109 thus urging the piston 107 outwardly in the absence of liquid flow pressure against the piston. The condition of the spring may be altered by manually rotating the shaft 139 and locking it in an adjusted position, which could be accomplished in a manner similar to the locking of the bushing in connection with adjusting the spring of the first embodiment.

It will be apparent from the foregoing description of my invention in its preferred form that the same is subject to alteration or modification without departing from the underlying principles involved, and while I have disclosed the same in considerable detail, I do not desire to be limited in my protection to such details except as may be necessitated by the appended claims.

I claim:

1. A meter of the turbine type having a minimized viscosity error, comprising a meter housing having spaced end sections, each including a plurality of substantially radial vanes terminating in and supporting a hollow flow guide on the longitudinal axis of said housing; a rotor assembly in said housing including end spiders and an intermediate spider, each including a hub in alignment with said flow guides, spokes radiating therefrom and terminating in a peripheral ring, rotor assembly housing sections between said spiders, a shaft passing freely through said intermediate spider hub and journalled at its ends in said end spider hubs, a plurality of turbine rotors on said shaft each including a hub, one of said rotors being to one side of and adjacent to said intermediate spider and having angularly disposed blades about the periphery of its hub to produce rotation in one direction, another turbine rotor being to the other side of and adjacent to said intermediate spider and having angularly disposed blades about the hub periphery thereof but at an angle producing a direction of rotation reverse to that of said first mentioned rotor, a third turbine rotor on said shaft in proximity to said second mentioned rotor and including angularly disposed blades about the hub periphery thereof corresponding in direction to those of said first mentioned rotor, the number of blades on each of said rotors being equal to the number required for a comparable meter having but one rotor of like diameter, divided by the number of rotors employed, means for fixing to said shaft, those rotors having like blade angles, a meter shaft journalled at one end in said intermediate spider hub and extending radially and upwardly therefrom, means for converting rotation of all said rotors to rotation of said meter shaft, said means including a bevel gear mounted on said meter shaft in the hub of said intermediate spider and extending to either side of said hub, a bevel gear affixed to each of said adjacent rotors and meshing with said first bevel gear; and means for compensating said meter for variations in film thickness on said blades attributable to liquid flow velocity changes, said means including a vane adapted to fit in the space between the flow guide at the intake end of said meter housing and the wall of said meter housing, means rotatably mounting said vane in said space, said means including a shaft from said vane and extending through and journalled in said flow guide, means responsive to flow velocity changes of liquid through said meter, for shifting the angular position of said vane from an initial position, said means including a pinion on said vane shaft, a piston assembly slidably supported in the intake end of said meter housing and including a piston in the flow path of liquid through said meter, said piston having a piston rod and included rack in mesh with said pinion, and spring means resisting flow actuated movements of said piston, and means for adjusting the initial tension of said spring means to alter the resistance characteristics thereof.

2. A meter of the turbine type having a minimized viscosity error, comprising a meter housing having spaced end sections, each including a plurality of substantially radial vanes terminating in and supporting a hollow flow guide on the longitudinal axis of said housing; a rotor assembly in said housing between said hollow flow guides and including a turbine rotor including angularly disposed peripheral blades; and means for compensating said meter for variations in film thickness on said blades attributable to liquid flow velocity changes, said means including a vane adapted to fit in the space between the flow guide at the intake end of said meter housing and the wall of said meter housing, means rotatably mounting said vane in said space, said means including a shaft from said vane and extending through and journalled in said flow guide, means responsive to flow velocity changes of liquid through said meter, for shifting the angular position of said vane from an initial position, said means including a pinion on said vane shaft, a piston assembly slidably supported in the intake end of said meter housing and including a piston in the flow path of liquid through said meter, said piston having a piston rod and included rack in mesh with said pinion, and spring means resisting flow actuated movements of said piston, and means for adjusting the initial tension of said spring means to alter the resistance characteristics thereof.

(References on following page)

References Cited in the file of this patent

UNITED STATES PATENTS

| | | |
|---|---|---|
| 1,303,443 | Wohlenberg | May 13, 1919 |
| 1,483,225 | Hammett | Feb. 12, 1924 |
| 1,893,233 | Hull | Jan. 3, 1933 |
| 1,964,784 | Nelson et al. | July 3, 1934 |
| 2,800,022 | Granberg | July 23, 1957 |
| 2,870,634 | Gehre | Jan. 27, 1959 |

FOREIGN PATENTS

| | | |
|---|---|---|
| 14,060 | Great Britain | Apr. 15, 1852 |
| 1,194,499 | France | May 11, 1959 |